June 19, 1923.
G. J. WALKER
TRACTOR WHEEL
Filed March 18, 1921
1,459,190
2 Sheets-Sheet 1
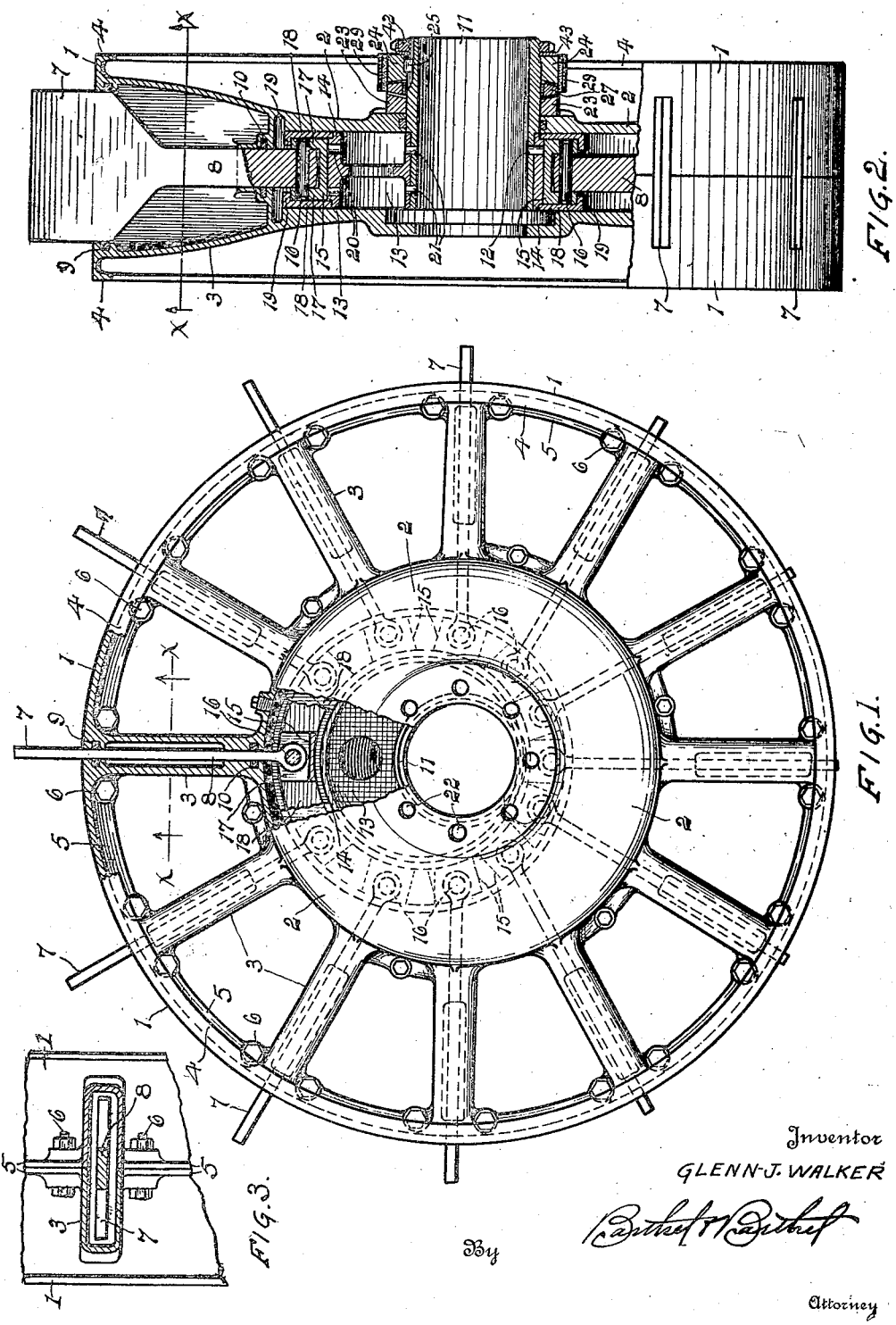
Inventor
GLENN J. WALKER
By
Attorney June 19, 1923.  
G. J. WALKER  
TRACTOR WHEEL  
Filed March 18, 1921
1,459,190
2 Sheets-Sheet 2
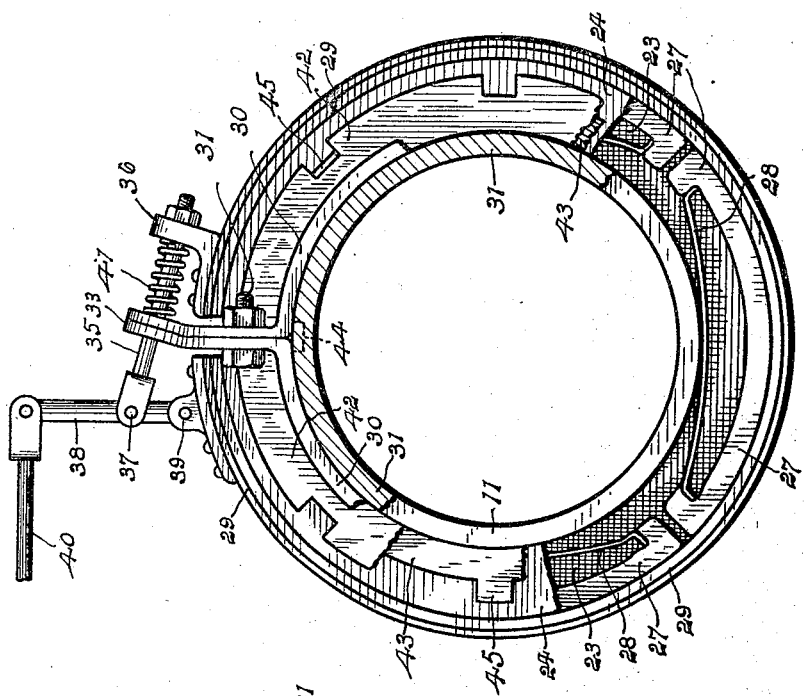
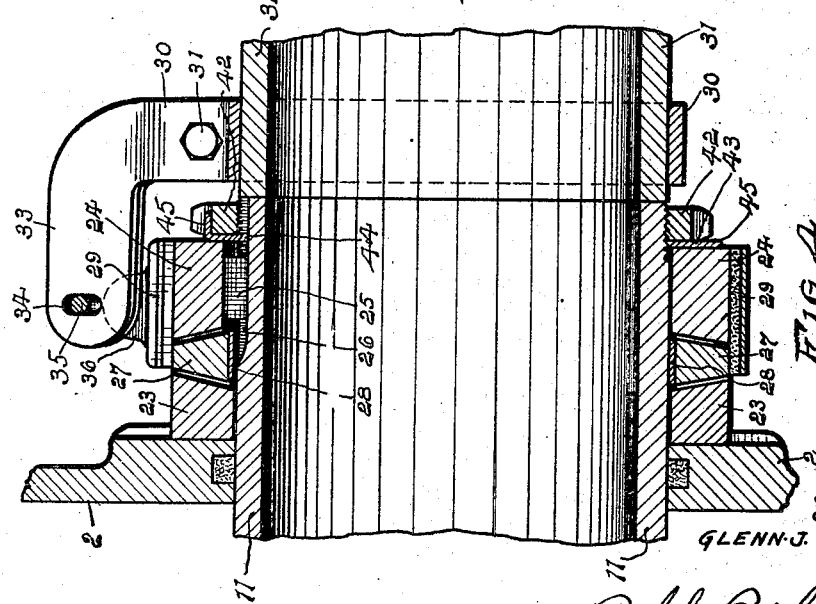
Inventor  
GLENN J. WALKER.
By
Attorney Patented June 19, 1923.

1,459,190

UNITED STATES PATENT OFFICE.

GLENN J. WALKER, OF DETROIT, MICHIGAN, ASSIGNOR TO MIDWESTERN TRACTOR WHEEL CO., OF DETROIT, MICHIGAN, A CORPORATION OF DELAWARE.

TRACTOR WHEEL.

Application filed March 18, 1921. Serial No. 453,444.

*To all whom it may concern:*

Be it known that I, GLENN J. WALKER, a citizen of the United States of America, residing at Detroit, in the county of Wayne and State of Michigan, have invented certain new and useful Improvements in Tractor Wheels, of which the following is a specification, reference being had therein to the accompanying drawings.

This invention relates to power or driving wheels for self-propelled vehicles, tractors and the like which are generally known as traction wheels and more particularly to such wheels provided with means for increasing their tractive force on the ground. An object of the invention is to provide an automatically operating self cleaning wheel of simple and efficient construction and wherein friction, twisting strains and stresses upon the spuds or blades are reduced to a minimum and all working parts protected from dust and dirt and effectually lubricated. A further object is to facilitate the adjustment of the operating mechanism to vary the operation of the spuds or blades to effect such adjustment by power means and during the normal operation of the wheel, if desired.

A further object is to provide a construction which is such as to greatly facilitate the dismounting, replacement or repair of the wheel and the adaptation thereof to different tractor or other motor driven devices, and to provide other new and useful features in the construction and arrangement of parts all as hereinafter more fully described.

With the above and other ends in view, the invention consists in the matters hereinafter set forth and more particularly pointed out in the appended claims, reference being had to the accompanying drawings, in which—

Figure 1 is a side elevation of a wheel illustrative of the invention, with portions broken away, and in section to more clearly disclose the construction;

Fig. 2 is a transverse vertical section of the same with a portion thereof in edge elevation;

Fig. 3 is a sectional detail substantially upon the lines X—X of Figs. 1 and 2;

Fig. 4 is an enlarged sectional detail of a hub portion of the wheel showing means for shifting a spud operating cam, and Fig. 5 is an end elevation of Fig. 4 with portions broken away and in section.

Tractor wheels which are provided with spuds or cleats secured to the rim of the wheel become fouled and not efficient when operated upon soft and muddy ground and their use upon public roads is prohibited. Movable spuds or blades which automatically move in and out through slots in the rim of the wheel, are self cleaning, but difficulty has been encountered in their operation due to dirt getting into the working parts, causing friction and wear and also due to binding of the parts in their bearings caused by the twisting and side strains on the blades. Further, the adjustment of the mechanism for operating these blades, has been difficult and slow when it is desired to change from field to road work, and it has been impossible to make adjustments during the operation of the wheel to vary the tractive force of the wheel during use. The several enumerated difficulties and objections have been overcome in the present construction and other advantages have been gained by the construction illustrated in the accompany drawings wherein is shown a wheel comprising a steel casting forming a flat wheel rim or felly 1, a central circular casing 2 having an axial opening to receive the vehicle axle or hub, and hollow spokes 3 connecting the central casing with the rim. This casting is made in two halves, with the dividing line or plane of meeting edges of the parts extending vertically through the rim for the wheel at right angles to the axis of rotation of the wheel. A substantially smooth flat peripheral surface of the wheel is therefore formed by the two rim portions of the two halves of the casting and this rim, for the purpose of strength and rigidity is provided with an inwardly extending flange 4 along each edge. Centrally of the rim at the meeting edges of the two halves of the casting are the inwardly extending flanges 5 between the hollow spokes 3 and the two parts of the wheel are secured together with the meeting edges of the rim portions in contact, by means of a series of bolts 6 passing through openings in the flanges 5.

The spokes 3 are hollow and are of greater width than thickness in cross section and in the rim 1 opposite the outer end of each hollow spoke is a transverse slot through which projects a blade or spud 7, the outer end of this blade being considerably wider than the inner end portion or arm 8, which arm extends through a bearing slot provided in the inner end of each spoke with the inner end of the arm 8 of each blade extending into the casing 2 of the wheel. Each blade or spud therefore has a bearing near its outer end where it passes through the slot in the rim and also has a bearing at the inner end of the spoke, and within the rim portion surrounding the slot for each blade, is a recess 9 to receive a suitable packing to contact the blade and prevent dirt or water from getting into the interior of the hollow spoke through the slot in the rim. A like recess 10 is provided in the casting at the inner end of each spoke and surrounding the slot through which the shank or arm 8 of the spoke extends, this recess being also provided with packing to contact the arm and make a tight joint to prevent dirt from getting into the casing 2 and also prevent lubricant from passing from the casing through the slot into the hollow spoke. The several spuds or blades therefor have a long bearing and are guided and held in their radial movement in and out of the slots in the rim.

A suitable hub for the wheel is provided by inserting a sleeve 11 in the axial opening of the casing 2 to turn therein, and rigidly secured to this sleeve in any suitable manner, as by a pin 12, is an eccentric 13, the peripheral surface of the rim 14 of which eccentric forms a bearing surface for a series of shoes 15, there being one shoe for each spud or blade and to the inner end of the arm 8 of which blade each shoe is pivotally secured by means of a pivot pin 16 passing through an eye in the end of the arm and through openings in side walls 17 of the shoe. The rim 14 of the eccentric is of a width to fit between the side walls of the casing 2 but free to turn within the casing and this rim is grooved along each edge to receive the inner edges of rings 18, which rings each have an inwardly extending flange 19 at their periphery to project over the outer sides of the blocks 15 and form outer guideways for the blocks. These blocks are therefore confined within a circular raceway, the inner side of which is the face of the rim 14 of the eccentric and the outer side of which is formed by the flanges 19 on the rings 18. These rings 18 also form side walls for the channel or raceway in which the blocks slide.

The sleeve 11 is designed to fit over to a suitable hub (not shown), said hub being carried by a fixed axle casing or being otherwise supported. The sleeve 11 and eccentric 13 which is secured thereto are normally held against rotation with the wheel, but may be adjusted or turned relative to the wheel, as hereinafter described, to adjust the relation of the eccentric to the wheel rim.

The eccentric being normally held against rotation, the wheel rotates about it as it travels over the ground, and as the blades are carried by the wheel, they are carried around the eccentric and thus by their connection with the blocks 15 move these blocks within the guide channel provided therefor which is eccentric to the axis of rotation of the wheel. The blades are therefore projected and retracted through the rim of the wheel as the wheel revolves, the blades traveling radially in and out within their bearings in the hollow spokes.

The moving parts may be thoroughly lubricated by putting a suitable lubricant in the casing 2, the lubricant being permitted to enter the channel in which the blocks slide, by providing suitable openings 20 in the rim of the eccentric and communication between this chamber and the interior of the sleeve 11 may also be provided by means of openings 21 through the sleeve. The escape of the lubricant through the ends of the sleeve and the axial opening in the outer side of the casing 2 opposite the end of the sleeve will be prevented by the hub portion of the wheel when inserted in the sleeve in the usual manner and by the driving axle, not shown, which will extend through the hub in the sleeve 11 and which may have driving connection with the wheel by providing the driving shaft or axle with the usual head or cap, not shown, connected in the usual manner with the wheel by means of bolts engaging openings 22 in the outer side of the casing 2.

When it is desired that the spuds or blades be retracted so that they will not engage the ground, as when running upon public roads, the eccentric 13 will be positioned relative to the wheel, as shown in Figs. 1 and 2, that is, the large side of the eccentric will be directly above the wheel axle so that the blocks traveling within the guide channel about the eccentric will be farthest from the axis of the wheel at the upper side of the wheel and nearest to said axis at the lower portion of the wheel. The blades which are moved by these blocks will therefore be retracted at the lower side of the wheel and extended at the upper side. They will therefore not engage the ground and will be in an inactive position, that is, they will not be operative to increase the traction of the wheel but will be constantly moving in and out through the rim as the wheel revolves. In order to cause the blades to project through the rim at the lower side of the wheel and thus become active in increasing its traction, the eccentric is adjusted or turned relative to the wheel and when so adjusted that its large side is directly below the axis of rotation of the wheel, the blades will be projected to their full extent where the wheel contacts the ground and will thus have the greatest hold on the ground to increase traction. For work in the field where the ground is very soft or muddy and the greatest traction of the wheel is desired, the eccentric will be adjusted to project the blades to their full extent at the lower side of the wheel but as these blades are constantly projected and retracted as the wheel turns, they will clear themselves of the mud which may adhere to the rim of the wheel and would otherwise pack in between the blades, and therefore these blades are always effective and the wheel will never be fouled to such an extent that it will slip and prevent the machine from pulling out of the mud under its own power. Should it be desirable to have the blades partially effective in increasing traction, as when the ground in the field is comparatively dry or hard, the eccentric may be adjusted to cause the blades to be projected just the desired distance at the lower side of the wheel.

To so adjust or turn the eccentric relative to the wheel, power means is provided for effecting such adjustment, and this power means is of such arrangement that it may be made active during the travel of the wheel and, therefore, the operator may at any time and while the tractor is in motion change the position of the eccentric and thus change the movement of the blades. He may therefore in passing from a field to the high road, cause the blades to be retracted and become inoperative without stopping the machine, or he may change, at will, the effectiveness of the blades at any time to suit the conditions of the ground over which he is traveling.

The power means employed for adjusting the eccentric comprises, as best illustrated in Figs. 4 and 5, a pair of rings 23 and 24 sleeved upon the inner end of the sleeve 11 which projects from the inner side of the axial opening in the wheel casing 2, the ring 23 being free to turn upon the sleeve and connected to the wall of the wheel casing in any suitable manner to turn therewith, or this ring may be formed as an integral part of the casing wall if found desirable. The ring 24 is connected to the sleeve in any suitable manner as by a key 25 engaged in a key seat 26 in the sleeve and a like seat in the ring. This ring is therefore rotatable with the sleeve. The rings 23 and 24 are spaced apart and their confronting faces are oppositely beveled or inclined inwardly in divergent relation. Between these opposed faces of the rings is a series of friction members or shoes 27 which are wedge shaped in cross section to wedge between the opposed surface of the rings when these shoes are moved radially outward. Each shoe is normally held pressed outwardly into firm frictional engagement with the opposed friction surfaces of the rings 23 and 24, by flat springs 28 interposed between the shoes and the sleeve 11. These friction shoes are therefore normally held by the springs 28 to frictionally connect the rings 23 and 24 so that they will turn together, and as the ring 24 is connected to the sleeve to turn therewith, said sleeve will be turned and rotate the eccentric 13 whenever the shoes 27 are permitted to move outwardly into frictional engagement with the rings and frictionally connect them.

To hold these shoes pressed inwardly against the action of their springs, and thus disconnect the rings 23 and 24, a brake band 29 is provided which band encircles the ring 24 and also extends over the several shoes to press the shoes inwardly when the band is contracted into engagement with the ring. When so contracted, the band not only holds the shoes out of frictional engagement but also holds the ring 24 against turning and therefore holds the sleeve 11 and eccentric 13 against turning.

The brake band 29 is carried by a suitable bracket 30 which is attached to a fixed non-rotatable part of the tractor, such as the axle housing indicated at 31 in the drawing. This bracket may be in the form of a ring encircling the end of the axle housing and rigidly secured thereto by means of a bolt 32, said bracket having a laterally projecting arm 33 provided with an opening 34 through which a rod 35 extends, said rod passing through an eye 36 secured to one end of the brake band and at its opposite end this rod is pivotally attached, as at 37, to an operating lever 38 intermediate the ends thereof, said lever being pivotally attached to an eye 39 on the other end of the brake band and to the outer or upper end of which is attached a rod 40 adapted to lead to a foot pedal (not shown) or other convenient means for exerting a pull upon the rod. Sleeved upon the rod 35 between the bracket arm 33 and the eye 36, is a coiled spring 41 which normally operates to hold the brake band expanded. A pull upon the rod 40 will move the ends of the brake band toward each other and contract it into close frictional engagement with the ring 24, at the same time coming into contact with the outer sides of the shoes 27 and pressing them inward, thus breaking the frictional connection between the rings 23 and 24. When the operator desires to adjust the eccentric 13, it is only necessary for him to release the brake band 29. This will release the clutch shoes 27 and at the same time release the ring 24. A frictional connection between the rotating wheel or casing 2 and the sleeve 11 which carries the eccentric 13 is thereby effected at the same time the ring 24 and sleeve and eccentric are released by the brake band so that the rotative motion of the wheel in traveling over the ground will be imparted to the sleeve 11 and turn the eccentric to the desired position. When the eccentric has reached the position to project the blades to the desired extent and in the direction desired, the brake band will again be set or contracted by the operator, thus pressing the clutch shoes 27 inwardly and coming in frictional contact with the ring 24, holding said ring and the sleeve 11 on which the eccentric is mounted firmly against rotation and in the desired position to which it has been adjusted.

The ring 24 being sleeved upon the end of the sleeve 11 and connected to said sleeve to turn therewith by means of the key 25, is free to move or to be adjusted longitudinally of the sleeve for the purpose of moving it toward or from the ring 23 to compensate for any wear which may occur of the contact faces of the shoes 27, and to so adjust and hold the ring 24 an adjusting ring 42 has a screwthreaded engagement with the end of the sleeve 11 and a lock washer or ring 43 is interposed between the ends of the ring 24 and the adjusting ring 42, the locking washer being provided with a tongue 44 to engage the key slot 26 and also being provided with lugs 45 on its periphery which may be bent into engagement with suitable notches in the periphery of the ring 42. The ring 42 may therefore be turned to adjust the ring 24 toward the shoes and when properly adjusted is held by turning one or more of the lugs 45 of the locking washer into engagement with the notches on the ring.

Obviously changes may be made in the construction and arrangement of parts within the scope of the appended claims without departing from the spirit of this invention and I do not therefore limit myself to the particular form or arrangement shown.

What I claim is:—

1. A traction driving wheel wherein power is applied to a member for driving the wheel and wherein said wheel is provided with projectable and retractable traction members, means for projecting said members, and means for operatively connecting and disconnecting said projecting means and said member to which driving power is applied, whereby said projecting means is adjusted to vary the degree of projection of said traction members by the power applied to turn the wheel, and simultaneously with the driven turning movement of said wheel.

2. In a traction wheel, the combination with movable traction members, of means for moving said traction members, and means operated by a turning movement of the wheel for adjusting said moving means to vary the tractive effect of said traction members.

3. In a traction wheel, the combination of retractable and extensible traction members, means for operating said members including an eccentric, and means for operatively connecting said eccentric to the wheel to cause said wheel and eccentric to turn together for the purpose of adjusting said eccentric.

4. A traction wheel including a rim having openings, a plurality of traction members slidable through said openings, said wheel being provided with bearings for said traction members and within which said traction members are guided to move radially of the wheel and held against lateral movement, means adjacent the hub of the wheel for operating said traction members, said means including a guideway and members movable in said guideway and comprising a series of blocks connected to the inner ends of said traction members.

5. A traction wheel as characterized in claim 4, and wherein said eccentric guideway includes portions to engage the inner and outer sides of said members which are slidable therein and connected to the inner ends of said traction members whereby the traction members are positively moved in both in and out movements and wherein said members in said guideway comprise a series of separate blocks, one for each traction member, pivotally connected to the inner ends of said traction members.

6. In a traction wheel, the combination with projectable and retractable traction members and means for operating said members including an eccentric, of means for connecting said eccentric to the wheel to turn therewith for the purpose of adjusting said eccentric, and means for holding said eccentric in the position to which it is adjusted.

7. A traction wheel as characterized in claim 6, and wherein means for connecting the eccentric to the wheel includes a clutch.

8. A traction wheel as characterized in claim 6, and wherein the means for connecting the eccentric to the wheel, and the means for holding the eccentric in adjusted position are simultaneously operative.

9. A traction wheel as characterized in claim 6, and wherein the means for connecting the eccentric to the wheel and means for holding said eccentric in the position to which it is adjusted are simultaneously operated by manually operable means adapted to be operated at a distance.

10. A traction wheel as characterized in claim 6, and wherein the means for connecting the eccentric to the wheel includes a clutch, and the means for holding the eccentric in adjusted position comprises a brake band arranged to operate the clutch upon the tightening of the brake band and to release the clutch and make the same effective when the brake band is released.

11. In a traction wheel, the combination of a series of radially movable traction members, a normally fixed eccentric guideway, means on the ends of the traction members engaging said guideway, a friction clutch for connecting the eccentric member to the wheel, a brake band for holding the eccentric member against rotation and for operating the friction clutch and lever mechanism manually operable at a distance for operating said brake band.

12. In a traction wheel, the combination of a body comprising a rim having openings and a central casing, a series of traction members movable radially of the wheel through said openings in the rim with their inner ends within the casing, an eccentric in the casing having an eccentric guideway, a plurality of separate blocks slidable in the guideway and pivotally attached to the inner ends of the traction members, a sleeve upon which the eccentric is mounted, a clutch for connecting the sleeve to the wheel body to turn therewith, means for holding the sleeve against turning movement, and means for manually operating said holding means and said clutch.

13. In a traction wheel, the combination of a body divided vertically on a central plane of the rim of the body into two parts, said body comprising a rim portion and a central casing with hollow spokes connecting said rim and casing, a plurality of traction blades slidable radially within the spokes through openings in the rim with their inner ends within the casing, said spokes providing bearings for said blades to guide the same radially of the wheel and prevent lateral movement of the blades, an eccentric within the casing providing an eccentric guideway, a plurality of blocks slidable in the guideway and pivotally connected to the inner ends of the blades, and means for adjusting the position of the eccentric relative to the wheel and holding the same in adjusted position.

In testimony whereof I affix my signature in presence of two witnesses.

GLENN J. WALKER.

Witnesses:
ARTHUR MINNICK,
LEWIS E. FLANDERS.